(12) United States Patent
Lamontagne et al.

(10) Patent No.: US 12,379,461 B2
(45) Date of Patent: Aug. 5, 2025

(54) MULTI-TIMESCALE DOPPLER PROCESSING AND ASSOCIATED SYSTEMS AND METHODS

(71) Applicant: Teledyne FLIR Commercial Systems, Inc., Goleta, CA (US)

(72) Inventors: Patrick Lamontagne, Montreal (CA); Michel Pelletier, Boisbriand (CA)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 341 days.

(21) Appl. No.: 17/613,347

(22) PCT Filed: May 18, 2020

(86) PCT No.: PCT/US2020/033498
§ 371 (c)(1),
(2) Date: Nov. 22, 2021

(87) PCT Pub. No.: WO2020/236766
PCT Pub. Date: Nov. 26, 2020

(65) Prior Publication Data
US 2022/0229152 A1 Jul. 21, 2022

Related U.S. Application Data

(60) Provisional application No. 62/852,150, filed on May 23, 2019.

(51) Int. Cl.
*G01S 7/28* (2006.01)
*G01S 7/288* (2006.01)
(Continued)

(52) U.S. Cl.
CPC ............ *G01S 7/2883* (2021.05); *G01S 13/04* (2013.01); *G01S 13/505* (2013.01); *G01S 13/726* (2013.01)

(58) Field of Classification Search
CPC ...... G01S 7/2883; G01S 13/04; G01S 13/505; G01S 13/726
(Continued)

(56) References Cited

U.S. PATENT DOCUMENTS

2012/0288023 A1* 11/2012 Karabinis ........... H04W 72/046
375/267
2015/0109163 A1* 4/2015 Peacock .............. G01S 13/0209
342/27
(Continued)

FOREIGN PATENT DOCUMENTS

CN 104459662 3/2015

OTHER PUBLICATIONS

Bialer, Oded, "Multi-Doppler Resolution Automotive Radar", 25th European Signal Processing Conference (EUSIPCO), 2017, pp. 1937-1941.

*Primary Examiner* — William Kelleher
*Assistant Examiner* — Samarina Makhdoom
(74) *Attorney, Agent, or Firm* — Haynes and Boone, LLP

(57) ABSTRACT

Multi-timescale Doppler processing and associated systems and methods are provided. In one example, a receiver receives radar return data, where the radar return data is associated with reflections, from a scene, of a plurality of transmitted radar signals. The radar return data is processed to obtain a plurality of sets of detection data, where each set of detection data of the plurality of sets of detection data is associated with a respective processing size. Target data associated with the scene is generated based at least in part on the plurality of sets of detection data. Related systems and methods are also provided.

20 Claims, 8 Drawing Sheets

(51) Int. Cl.
    *G01S 13/04*     (2006.01)
    *G01S 13/50*     (2006.01)
    *G01S 13/72*     (2006.01)

(58) Field of Classification Search
    USPC .......................................................... 342/196
    See application file for complete search history.

(56) References Cited

U.S. PATENT DOCUMENTS

| | | | |
|---|---|---|---|
| 2016/0018511 A1* | 1/2016 | Nayyar | G01S 7/03 |
| | | | 342/27 |
| 2018/0045810 A1* | 2/2018 | Ygnace | G01S 7/288 |
| 2018/0172815 A1* | 6/2018 | Mckitterick | G01S 13/343 |
| 2018/0321368 A1* | 11/2018 | Bharadwaj | G01S 13/931 |
| 2018/0356495 A1* | 12/2018 | Moss | G01S 7/021 |
| 2019/0041494 A1* | 2/2019 | Roger | G01S 7/003 |

* cited by examiner

MULTI-TIMESCALE DOPPLER PROCESSING AND ASSOCIATED SYSTEMS AND METHODS

CROSS-REFERENCE TO RELATED APPLICATIONS

This patent application is a U.S. National Stage Patent Application under 35 U.S.C. 371 of International Patent Application No. PCT/US2020/033498, filed May 18, 2020 and entitled "MULTI-TIMESCALE DOPPLER PROCESSING AND ASSOCIATED SYSTEMS AND METHODS," which claims priority to and the benefit of U.S. Provisional Patent Application No. 62/852,150 filed May 23, 2019 and entitled "MULTI-TIMESCALE DOPPLER PROCESSING AND ASSOCIATED SYSTEMS AND METHODS," each of which is incorporated herein by reference in its entirety.

TECHNICAL FIELD

One or more embodiments relate generally to radar processing and more particularly, for example, to multi-timescale doppler processing and associated systems and methods.

BACKGROUND

Radar systems are commonly used to detect targets (e.g., objects, geographic features, or other types of targets), such as targets in proximity to watercraft, aircraft, vehicles, or fixed locations. The radar systems may transmit (e.g., broadcast) radar signals and receive return signals. Such return signals may be based on reflections of the transmitted radar signals by targets.

SUMMARY

In one or more embodiments, a method includes receiving, by a receiver, radar return data, where the radar return data is associated with reflections, from a scene, of a plurality of transmitted radar signals. The method further includes processing the radar return data to obtain a plurality of sets of detection data, where each set of detection data of the plurality of sets of detection data is associated with a respective processing size. The method further includes generating target data associated with the scene based at least in part on the plurality of sets of detection data. In some aspects, the method further includes determining whether to perform a mitigation action based on the target data. If a mitigation action is determined to be needed, the method further includes performing a mitigation action and/or causing a mitigation action to be performed.

In one or more embodiments, a system includes a receiver configured to receive radar return data, where the radar return data is associated with reflections, from a scene, of a plurality of transmitted radar signals. The system further includes a processor coupled to the receiver. The system further includes a non-transitory machine-readable medium comprising instructions stored therein, which when executed by the processor, cause the processor to perform operations. The operations include processing the radar return data to obtain a plurality of sets of detection data, where each set of detection data of the plurality of sets of detection data is associated with a respective processing size. The operations further include generating target data associated with the scene based at least in part on the plurality of sets of detection data.

In some embodiments, processing of the radar return data includes performing a first plurality of Fast Fourier Transforms (FFTs) on a radar measurements matrix using a first processing size to provide a first plurality of FFT outputs. The processing further includes performing a second plurality of FFTs on the radar measurements matrix using a second processing size to provide a second plurality of FFT outputs. The processing further includes generating a first set of detection data of the plurality of sets of detection data based on the first plurality of FFT outputs. The processing further includes generating a second set of detection data of the plurality of sets of detection data based on the second plurality of FFT outputs. The target data is based at least in part on the first set of detection data and the second set of detection data.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
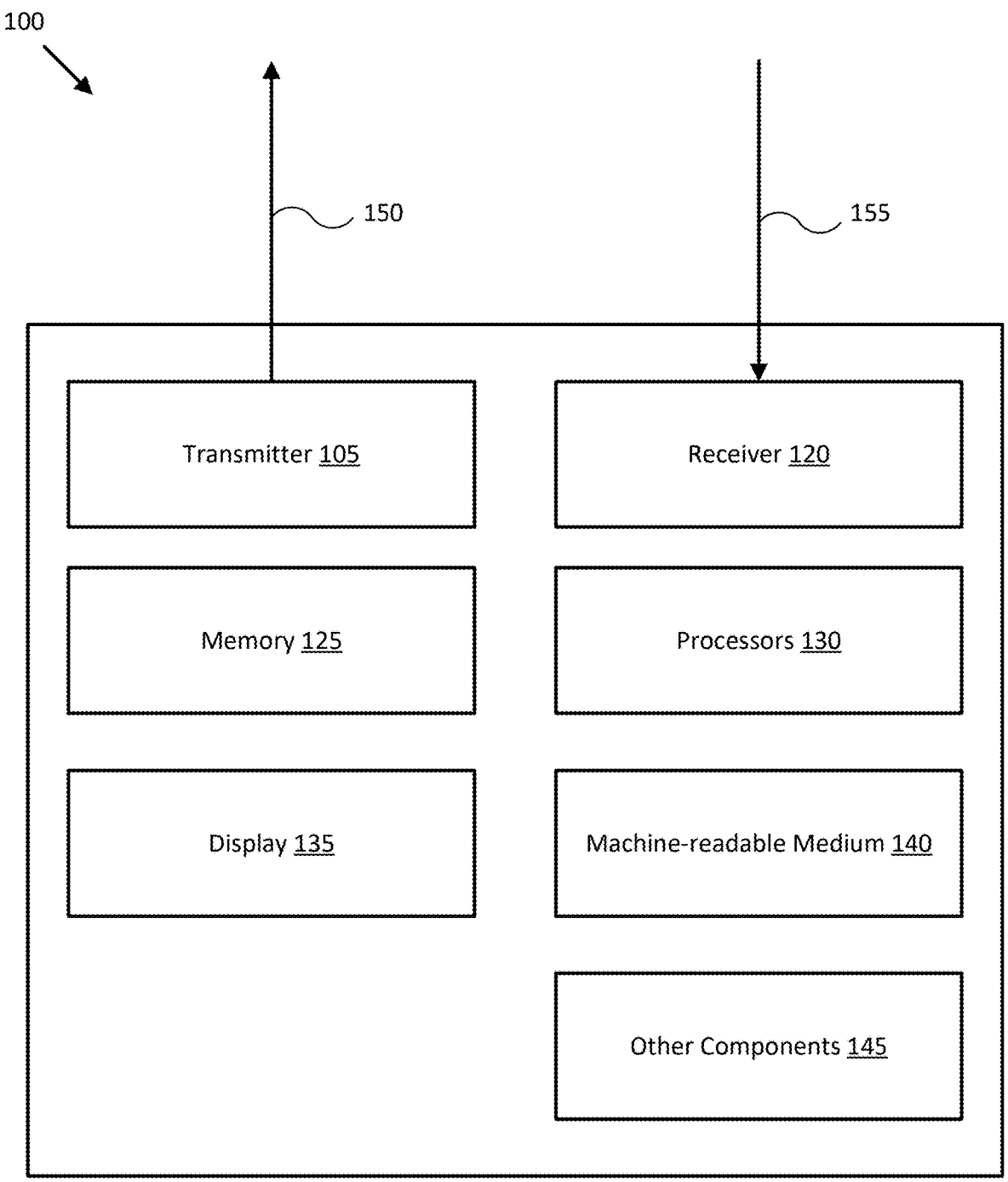
FIG. 1 illustrates a block diagram of an example radar system in accordance with one or more embodiments of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various systems and methods are disclosed for providing hybrid multi-timescale Doppler processing. In some embodiments, a receiver for a radar system receives electromagnetic (EM) signals associated with a scene. The received EM signals are typically reflections of transmitted signals that impinge upon objects in the scene. Such received EM signals may be referred to as radar return signals or radar return data. The transmitted signals may be pulse signals, ramp signals (e.g., in the case of frequency modulated continuous waveform (FMCW) signals), or other types of signals dependent on application. For explanatory purposes only, the transmitted signals are primarily referred to as pulse signals, although the various embodiments described herein may be applied to ramp signals or other types of signals.

In an aspect, the received EM signals may be converted by the radar system into baseband data (e.g., complex-valued baseband data) that may be arranged in a three-dimensional array of size N-by-M-by-L (e.g., also denoted as N×M×L). The three-dimensional array may be referred to as a radar data cube, a radar measurements matrix, or simply a measurements matrix. In some embodiments, the three-dimensional array is a radar data cube that may be provided for Doppler processing. N may be associated with range bins (e.g., also referred to as range cells or range indices) and referred to as a fast-time dimension. M may be associated with transmitted signals (e.g., pulses or ramps) and referred to as a slow-time dimension. L may be associated with receiver antennas and referred to as a spatial dimension. For explanatory purposes, an N×M×1 matrix (e.g., referred to simply as an N×M matrix) representing the fast-time and slow-time two-dimensional matrix for a single spatial index in the L spatial dimension (e.g., a single receiver antenna) is further discussed below. In an aspect, each element of the two-dimensional matrix may be referred to as a range cell value and may be associated with a signal energy (e.g., a reflected signal received by a receive antenna) for a certain range bin and a certain transmitted signal. Techniques related to a two-dimensional measurements matrix for a single spatial index (e.g., a single receiver antenna) may be applicable/extended to remaining spatial indexes (e.g., if any additional receiver antennas are present and utilized in the radar system) of the spatial dimension.

In some embodiments, processing of the radar return data may be performed to obtain sets of detection data. Each set of detection data may be associated with a respective processing size. In an aspect, the radar return data may include range cell values. In some cases, the range cell values may be obtained by sampling signal energy of the EM signals received by the receiver. It is noted that, dependent on context, the radar return data may refer to the EM signals received by the receiver and/or the range cell values obtained based on the received EM signals. In one aspect, the processing of the radar return data may include performing a transform over a number of ramps/pulses. The transform may be a Discrete Fourier Transform (DFT). In one case, a processing step may include performing a Fast Fourier Transform (FFT) over a number of pulses/ramps. In this regard, in some aspects, the processing of the radar return data is performed over portions of the radar return data using various numbers of pulses or ramps. The number of pulses/ramps may be referred to as a processing size. For example, the processing size may be a transform size such as an FFT processing size.

The processing may include performing several FFTs using various processing sizes. Such performing of FFTs may be referred to as Doppler FFT processing. Each of the FFTs may be performed on a portion of the radar return data (e.g., a portion of the radar measurements matrix) using one of a plurality of FFT sizes. In some aspects, the FFTs are performed over an axis (e.g., a dimension) associated with the radar return data. In some cases, the several FFTs are performed over the slow-time axis (e.g., the pulse/ramp axis) utilizing the various processing sizes. In these cases, each of these FFTs provide an FFT output that represents, for a given range bin along the fast-time axis, a frequency distribution corresponding to a number of sampled signals associated with a Doppler depth. The FFT outputs may then be processed to generate sets of detection data for the radar return data, where each of the sets of detection data is associated with a respective Doppler depth. In an aspect, a Doppler depth may be indicative of or refer to a maximum potential detection range (e.g., maximum nominal detection range) associated with a particular processing size. As an example, the FFT outputs may allow, for instance, determination of velocity (e.g., relative to the radar system that transmitted the pulses/ramps and received the radar return data), and, consequently, facilitate detection of targets at least on the basis of such determined velocity.

In some cases, such FFTs may be concurrently performed, such that FFTs corresponding to different Doppler depths can be performed concurrently. In one case, three processing sizes are used in concurrently performing FFTs over the slow-time axis. As one example of such a case, the processing sizes may be 4, 8, and 16. In other cases, more or fewer than three processing sizes may be utilized, and/or different processing sizes than 4, 8, and/or 16 may be utilized. The particular processing sizes and number of different processing sizes may be determined for a desired application.

In some embodiments, by way of non-limiting examples, detection processing (e.g., processing of the FFT outputs) to generate detection data may include performing Constant False Alarm Rate (CFAR) schemes, Clutter-Map schemes, thresholding schemes, and/or centroid processing. CFAR schemes may be performed to facilitate adaptively determining detection thresholds based on radar returns from several neighboring range cells. CMAP schemes may be performed to facilitate filtering out clutter (e.g., static clutter). For example, clutter may be a radar return from an object or objects that are of no interest to the radar application, such as trees in some cases. In an aspect, an object of interest may be referred to as a target. Whether an object is of interest is generally dependent on application. Thresholding schemes may be performed to facilitate determining if an instantaneous radar return in one range cell exceeds a threshold and should be considered a detection of a target. In some instances, a presence and/or movement of a target in a measurable way (e.g., above a threshold probability of a target being present and/or above a threshold amount of movement) by a radar system may be referred to as a detection of the target. Centroid processing may be performed to determine a precise location of grouped-detections based on center-of-intensity.

In some embodiments, by way of non-limiting examples, detection data (e.g., generated based on the FFT outputs) may include detections associated with one or more targets (e.g., and/or data to derive such detections); centroid position information in range, Doppler, and/or azimuth; signal intensity for radar return signals; signal-to-noise (SNR) ratio for detected signals to provide information about noise/clutter surrounding a target; information about the size of a detection in range (e.g., depth); Doppler (e.g., Doppler spread), and azimuth (e.g., target width); and/or a timestamp (e.g., a time at which detection information is obtained).

In some embodiments, the FFT outputs are processed immediately upon availability to generate detection data. For example, the detection data resulting from processing the FFT outputs may be sent to a tracker for processing immediately upon availability. The tracker may process the detection data immediately upon availability to provide an updated output of radar tracks. When the tracker receives additional detection data (e.g., associated with additional FFT outputs), the tracker may update and/or filter the radar tracks as appropriate based on the additional detection data. The radar tracks not associated with the additional detection data may be are coasted/extrapolated until the next update.

In an aspect, some FFT outputs may contain detection data associated with the same range cell(s) (e.g., range, azimuth, and Doppler), and may be merged to avoid creating several tracks for the same target in the scene. For example, the detection data obtained from processing the FFT outputs may be redundant because the FFT outputs may be generated based on overlapping information of the radar return (e.g., common range cell values). Merging detection data to avoid creating multiple targets corresponding to each Doppler depth may be performed in various ways. For example, the merging may be performed by determining which detection data share common range cell values, and grouping such detection data together. In one case, the grouping may be done by keeping only the detection data associated with the largest SNR.

In some embodiments, the tracker generates target data. Target data may include information associated with one or more targets or potential targets detected by the radar system. Such information may include, for example, a location of a target and a velocity (e.g., speed and direction) of a target. Non-limiting examples of target generation are provided as follows. Generating target data may be performed by target tracking algorithms such as associating new contacts with existing tracks. In an aspect, tracks of a target refer to radar observations (e.g., consecutive radar observations) of the target. Generating target data may be performed by updating/filtering new track positions using information such as centroid position information from newly associated contact(s). Generating target data may be performed by extrapolating/coasting positions of tracks that do not receive new detection data in the current scan/iteration (e.g., no association). Generating target data may be performed by initiating new tracks with un-associated contacts. Generating target data may be performed by terminating tracks with no recent associations. In an aspect, the tracker generates scene information of a scene. The scene information may include target data (e.g., information associated with objects of interest) and other information (e.g., information associated with objects not of interest and/or generally other information associated with the scene).

In some embodiments, the target data that is generated may be utilized to determine whether and/or what type of actions to perform. If the target data indicates that no targets are present, the radar system continues to monitor for targets without performing any mitigation actions. If the target data indicates that a target(s) is present, the radar system (e.g., human operator, autonomous system) may determine whether and/or what type of mitigation actions to perform. For example, if the radar system is utilized as part of a search-and-rescue application, a target may be a person needing to be rescued and a mitigation action in response to identifying the target (e.g., determining position and/or velocity of the target) may be to transmit signals to appropriate first responders to provide aid to the target. As another example, if the radar system is utilized as part of a navigation application of a manned or unmanned vehicle, a target may be an obstacle (e.g., moving or otherwise) to be avoided during navigation and a mitigation action in response to identifying the target (e.g., determining position and/or velocity of the target) may be to maneuver (e.g., autonomously or with human action) the vehicle to avoid the target.

A radar system may acquire a signal over a length of time, where the length of time is commensurate with a strength of an SNR for the signal and a detection range. In general, a longer length of time corresponds to a higher/stronger SNR for the signal and a longer detection range. Acquiring the signal over a longer period of time may also be associated with a slower radar refresh rate (e.g., also referred to as a radar update rate). In an aspect, a radar refresh/update rate is associated with a rate at which data associated with a volumetric space scanned by the radar system is generated and updated. Such data may indicate potential targets or lack thereof within the volumetric space. Using various embodiments, the radar system may achieve a fast update rate while allowing for a high SNR and long detection range by concurrently (e.g., simultaneously) processing overlapping data (e.g., the same radar return data) on different timescales and combining and/or merging results from the processing to produce an integrated output. In an aspect, the overlapping data is processed to generate FFT outputs, which in turn is processed to generate detection data. The detection data may be combined, merged, and/or further processed to generate target data. The concurrent processing may be performed utilizing a number of different processing sizes (e.g., the number of pulses). In this regard, each timescale for processing the overlapping data corresponds to a different processing size. The processing sizes and number of processing sizes used is generally dependent on application and may be based on a compromise between detection power, Minimum Detectable Velocity (MDV) (e.g., separability of targets having similar speeds), and/or update rate (e.g., capability to track maneuvering targets).

As an example, processing using more pulses (e.g., corresponding to more data points) in performing Doppler processing (e.g., Doppler FFT) may result in more signal energy (e.g., associated with longer detection ranges) and finer speed resolution (e.g., the ability to detect slow targets and/or to discriminate targets having similar speeds), but may be associated with a decrease in an update rate and a consequent decrease in the capability to track maneuvering targets. Utilization of fewer pulses in performing the Doppler processing may allow for a higher update rate and consequently an increase in the capability to track maneuvering targets, but may be associated with less signal energy and, consequently, shorter detection ranges and coarser resolution (e.g., less capability to detect slow targets and/or to discriminate targets having similar speeds). By processing data associated with the same pulses using different processing sizes, the radar system according to various embodiments described herein may achieve performance characteristics associated with a higher number of pulses (e.g., more signal energy, longer detection range, and finer speed resolution) while also achieving performance characteristics associated with a fewer number of pulses (e.g., higher update rate). For instance, the performance characteristics associated with using a fewer number of pulses (e.g., higher update rate) may facilitate detection/tracking of targets closer to the radar system, whereas the performance characteristics associated with using a higher number of pulses (e.g., longer detection range, finer speed resolution) may facilitate detection/tracking of targets farther from the radar system.

Referring now to the drawings, FIG. 1 illustrates a block diagram of a radar system 100 in accordance with one or more embodiments of the present disclosure. Variations in the arrangement and type of the components may be made without departing from the spirit or scope of the claims as set forth herein. Additional components, different components, and/or fewer components may be provided. In various embodiments, the radar system 100 may be configured for use on watercraft, aircraft, vehicles, fixed locations, or other environments, and may be used for various applications such as, for example, leisure navigation, commercial navigation, military navigation, other types of navigation, or other applications. In one aspect, the radar system 100 may be implemented as a relatively compact portable unit that may be conveniently installed by a user. For example, the radar system 100 may be installed in a mobile device.

The radar system 100 includes a transmitter circuitry 105, a receiver circuitry 120, a memory 125, processors 130, a display 135, a machine-readable medium 140, and other components 145. The transmitter circuitry 105 includes one or more transmit (TX) antenna elements and appropriate circuitry to generate radar signals and provide such radar signals to the TX antenna elements, such that these radar signals can be transmitted by the TX antenna elements. Such transmitted radar signals are denoted as signals 150 of FIG. 1. The transmitter circuitry 105 may include a waveform generator that generates various waveforms to be utilized as radar signals. Such waveforms may include pulses of various lengths (e.g., different pulse widths), FMCW signals, and/or other waveforms appropriate for radar applications. FMCW signals may be implemented, for example, as rising, falling, or rising/falling frequency sweeps (e.g., upchirps, downchirps, or up/down chirps). The transmitter circuitry 105 may include one or more power amplifiers that receive the radar signals from the waveform generator and drive the radar signals on the TX antenna element(s) of the transmitter circuitry 105. In some cases, characteristics of the radar signals may be based at least in part from control signals received by the processors 130.

The receiver circuitry 120 may include one or more receive (RX) antenna elements (e.g., phased array antennas) and circuitry to process radar signals received by the RX antenna elements. Such received radar signals are denoted as signals 155 of FIG. 1. The RX antenna elements can receive the radar signals 155, which may be reflections of the transmitted radar signals 150 from targets/objects. These received radar signals 155 may be referred to as return signals. The receiver circuitry 120 may include appropriate circuitry to process these return signals. The receiver circuitry 120 may include one or more low-noise amplifiers (LNAs) for amplifying the received radar signals 155. The receiver circuitry 120 may include a demodulator to receive the radar signals 155 and convert the received radar signals 155 to baseband. In some cases, the demodulator may generate I signals and Q signals based on the received radar signals 155. The receiver circuitry 120 may include filters (e.g., low-pass filters) to be applied to the radar signals (e.g., baseband radar signals). The receiver circuitry 120 may include an analog-to-digital (ADC) circuit to convert the received radar signals 155, or filtered versions thereof, which are analog signals, to digital radar signals. The digital radar signals may be provided to the processors 130 for further processing to facilitate radar applications (e.g., target detection applications).

The processors 130 may be implemented as any appropriate processing device (e.g., microcontroller, processor, application specific integrated circuit (ASIC), logic device, field-programmable gate array (FPGA), circuit, or other device) that may be used by the radar system 100 to execute appropriate instructions, such as non-transitory machine readable instructions (e.g., software) stored on the machine-readable medium 140 and loaded into the memory 125. For example, on an RX side, the processors 130 may be configured to receive and process radar data received by the receiver circuitry 120, store the radar data, processed radar data, and/or other data associated with the radar data in the memory 125, and provide the radar data, processed radar data, and/or other data associated with the radar data for processing, storage, and/or display. In this example, outputs of the processors 130 may be, or may be derived into, representations of processed radar data that can be displayed by the display 135 for presentation to one or more users. On a TX side, the processors 130 may generate radar signals or associated signals to cause radar signals to be generated and fed to the transmitter circuitry 105, such that these radar signals can be transmitted by the TX antenna element(s) of the transmitter circuitry 105. In an embodiment, the processors 130 may be utilized to process radar return data (e.g., perform FFTs, perform detection processing on FFT outputs) received via the receiver circuitry 120, generate target data, perform mitigation actions or cause performing of mitigation actions if appropriate in response to the target data, and/or other operations.

The memory 125 includes, in one embodiment, one or more memory devices configured to store data and information, including radar data. The memory 125 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the processors 130 may be configured to execute software instructions stored in the memory 125 so as to perform method and process steps and/or operations. The processors 130 may be configured to store in the memory 125 data such as, by way of non-limiting example, filter coefficients, beamforming coefficients, and object/target detection data.

The display 135 may be used to present radar data, images, or information received or processed by the radar system 100. In one embodiment, the display 135 may be a multifunction display with a touchscreen configured to receive user inputs to control the radar system 100.

The radar system 100 may include various other components 145 that may be used to implement other features such as, for example, sensors, actuators, communications modules/nodes, other user controls, communication with other devices, additional and/or other user interface devices, and/ or other components. In some embodiments, other components 145 may include a humidity sensor, a wind and/or water temperature sensor, a barometer, a visible spectrum camera, an infrared camera, and/or other sensors providing measurements and/or other sensor signals that can be displayed to a user and/or used by other devices of radar system 100 to provide operational control of the radar system 100.

For example, such sensor signals may be utilized to compensate for environmental conditions, such as wind speed and/or direction; swell speed, amplitude, and/or direction; and/or an object in a path (e.g., line of sight) of the radar system 100. Imagers (e.g., visible spectrum camera, infrared camera) may be utilized to provide situational awareness of a scene, such as by providing image data associated with captured radar data. In some cases, sensor information can be used to correct for movement (e.g., changes in position and/or speed) associated with the radar system 100 between beam emissions to provide improved alignment of corresponding radar returns/samples, for example, and/or to generate imagery based on the measured orientations and/or positions of the radar system 100 assembly/antennas. In some cases, an external orientation and/or position sensor can be used alone or in combination with an integrated sensor or sensors. In some cases, alternatively or in addition to having sensors and/or other devices as part of the radar system 100, the sensors and/or other devices may be collocated with the radar system 100. Such sensors and/or other devices may provide data to the radar system 100 (e.g., via wired and/or wireless communication).

In some cases, the radar system 100 may include one or more visible spectrum cameras and/or one or more infrared cameras, such as to capture image data of a scene scanned by the radar system 100. In one embodiment, the other components 145 includes a communication interface that may communicate with another device that may be implemented with some or all of the features of the radar system 100. Such communication may be performed through appropriate wired or wireless signals (e.g., Wi-Fi™, Bluetooth™, or other standardized or proprietary wireless communication techniques). In one example, the radar system 100 may be located at a first position (e.g., on a bridge of a watercraft in one embodiment) and may communicate with a personal electronic device (e.g., a cell phone in one embodiment) located at a second position (e.g., co-located with a user on another location on the watercraft). In this regard, the user's personal electronic device may receive radar data and/or other information from the radar system 100. As a result, a user may conveniently receive relevant information (e.g., radar images, alerts, or other information) even while not in proximity to the radar system 100.

In one or more embodiments, a multi-timescale approach to measurement and processing of Doppler data in a radar system is provided. The multi-timescale approach may begin with a range number (e.g., fast-time) and pulse number (e.g., slow-time) two-dimensional array (e.g., matrix) of baseband data. It is noted that for explanatory purposes only the radar system transmits pulses, although the various embodiments may be utilized with other types of transmitted signals, such as ramps. In this regard, in the case of a FMCW radar system, ramps may be utilized instead of pulses.

In some embodiments, an FFT is performed over (e.g., applied along) the slow-time axis (e.g., the pulses of the slow-time axis) to extract Doppler information, such as velocity (e.g., speed and direction), of targets detected by the radar system. In the multi-timescale approach, processing of radar data can be performed according to different processing sizes (e.g., associated with different number of pulses). In an aspect, when FFTs are utilized as part of the processing of the radar data, the processing size may be indicative of an FFT size.

In some aspects, the processing size(s) (e.g., the number of pulses) utilized in processing is generally dependent on application and may be based on a compromise between detection power, MDV (e.g., separability of targets having similar speeds), and/or update rate (e.g., capability to track maneuvering targets). As an example, processing using more pulses (e.g., corresponding to more data points) in performing Doppler processing (e.g., Doppler FFT) may result in more signal energy (e.g., associated with longer detection ranges) and finer speed resolution (e.g., the ability to detect slow targets and/or to discriminate targets having similar speeds), but may be associated with a decrease in an update rate and consequent decrease in the capability to track maneuvering targets. Utilization of fewer pulses in performing the Doppler processing may allow for a higher update rate and consequently an increase in the capability to track maneuvering targets, but may be associated with less signal energy and, consequently, shorter detection ranges and coarser resolution (e.g., less capability to detect slow targets and/or to discriminate targets having similar speeds).

In some embodiments, when a transmitted signal is reflected by an object in a scene (e.g., a potential target present in the scene) and is received by a radar system, the radar system's receiver passband bandwidth may determine how much of the received signal energy is captured by the radar system. A measurements matrix (e.g., also referred to as a radar data matrix) for a single detection beam (e.g., a single receive antenna) may be provided as follows:

$$\begin{bmatrix} rc_{0,0} & \cdots & rc_{0,j} & \cdots & rc_{0,M-1} \\ \vdots & \ddots & \vdots & \ddots & \vdots \\ rc_{i,0} & \cdots & rc_{i,j} & \cdots & rc_{i,M-1} \\ \vdots & \ddots & \vdots & \ddots & \vdots \\ rc_{N-1,0} & \cdots & rc_{N-1,j} & \cdots & rc_{N-1,M-1} \end{bmatrix} \quad (1)$$

The measurements matrix has a size of N rows and M columns, where each row is associated with a range index (e.g., fast-time axis) and each column is associated with a pulse (e.g., slow-time axis). Each row of the matrix (1) represents a series of measurements from the same range bin over M successive pulses. Range cell values $rc_{i,j}$ of the measurements matrix may be the sampled signal energy captured by a receiver of the radar system for a single spatial dimension (e.g., a single receive antenna). In the measurements matrix above, the range cell values $rc_{i,j}$ are provided for a range index $i=[0, N-1]$ and pulse index $j=[0, M-1]$, such that the measurements matrix provides the sampled signal for each range index (e.g., $0^{th}$ range index to $(N-1)^{th}$ range index) and each pulse (e.g., $0^{th}$ pulse to $(M-1)^{th}$ pulse). For example, a range cell value $rc_{0,0}$ is the sampled signal energy for a zeroth range index and a first pulse (e.g., pulse 0). In an aspect, a range cell value $rc_{i,j}$ may be a result obtained from sampling the radar return data received by the radar system's receiver and applying a window to the sampled data. In the case of multiple receive antennas, the measurements matrix may be of size N×M×L, where L is the number of receive antennas. In this regard, in the above example, L=1. As an example, in some cases, a sampling rate in the fast-time dimension (e.g., vertical dimension in matrix (1)) is at least equal to twice the processed bandwidth. In some cases, the slow-time dimension (e.g., horizontal dimension in matrix (1)) may be sampled at a pulse repetition interval (PRI) of the radar (e.g., T) and, similarly, a sampling rate in the slow-time dimension may be provided by a pulse repetition frequency (PRF) (e.g., 1/T). An amount of time M*T represented by the matrix (1) may be referred to as a coherent processing interval (CPI).

Doppler processing may be performed on the range cell values of the measurements matrix to obtain Doppler information. For example, the Doppler information may include frequency and velocity information for targets or potential targets in the scene. In an embodiment, Doppler processing may be performed on the measurements matrix according to different processing sizes. Each processing size may be a different number of ramps or pulses. In an embodiment, the Doppler processing may include performing Doppler FFT processing for each range index over a number of pulses. In this regard, an FFT as provided below can be performed for each range bin over a number of pulses:

$$x_{i,k} = \sum_{n=0}^{D-1} rc_{i,n} \cdot e^{-\frac{i2\pi kn}{D}} \quad (2)$$

In Equation (2), the number of pulses (e.g., or ramps in the case that FMCW signals are transmitted) is the processing size of the FFT (e.g., denoted as D in Equation (2)). The processing size of the FFT corresponds to a Doppler depth.

FIGS. 2A-2D illustrate Doppler FFTs performed on a multi-timescale approach using various processing sizes in accordance with one or more embodiments of the present disclosure. In some embodiments, the Doppler FFTs may be performed simultaneously. The Doppler FFTs are performed over pulses for each of range bins 205 of a radar data matrix 200.

Figure 2A:
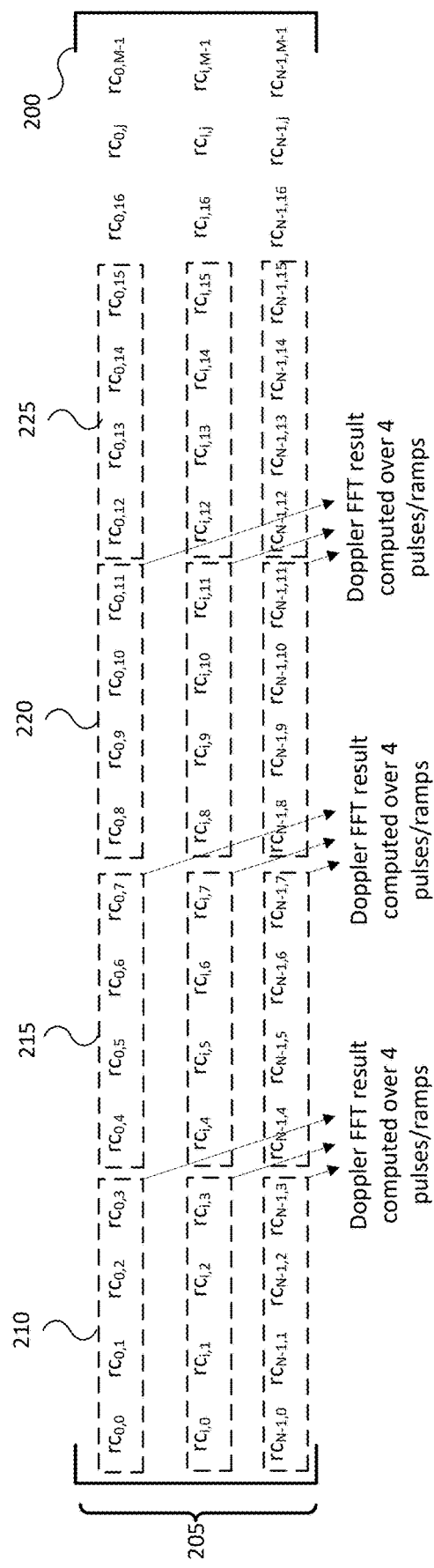
FIGS. 2A, 2B, and 2C illustrate examples of Doppler processing performed according to different processing sizes in accordance with one or more embodiments of the present disclosure.

FIG. 2A illustrates each Doppler FFT performed over 4 pulses (e.g., processing size is 4) for each of the range bins 205. For example, for a 0$^{th}$ range bin, a first Doppler FFT is performed over data set 210, a second Doppler FFT is performed over data set 215, a third Doppler FFT is performed over data set 220, and a fourth Doppler FFT is performed over data set 225.

Figure 2B:
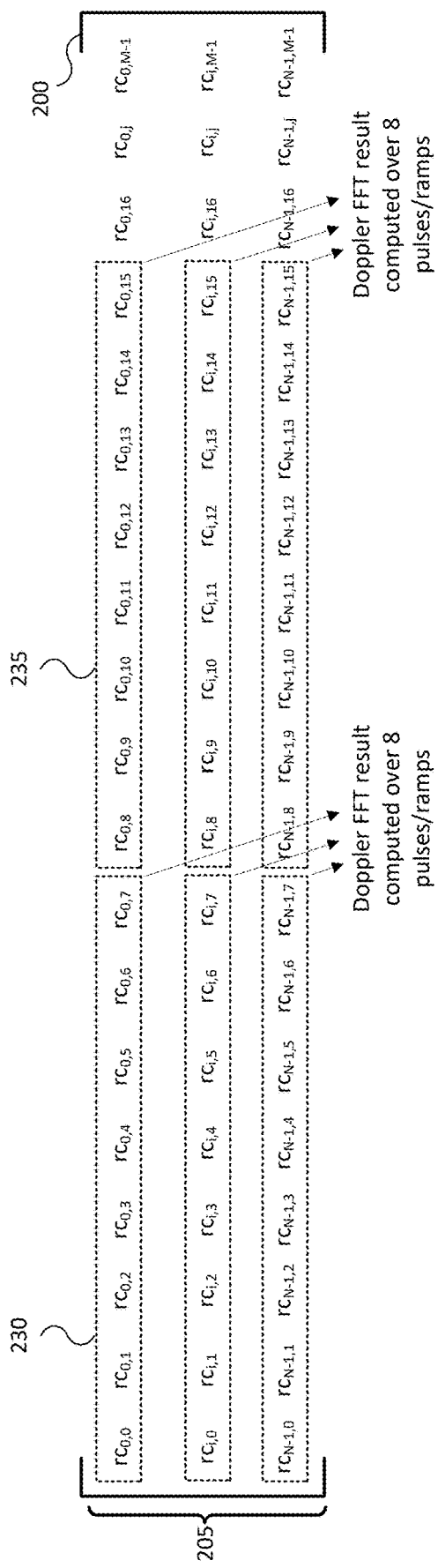

FIG. 2B illustrates each Doppler FFT performed over 8 pulses/ramps (e.g., processing size is 8) for each of the range bins 205. For example, for a 0$^{th}$ range bin, a Doppler FFT is performed over data set 230 and another Doppler FFT is performed over data set 235.

Figure 2C:
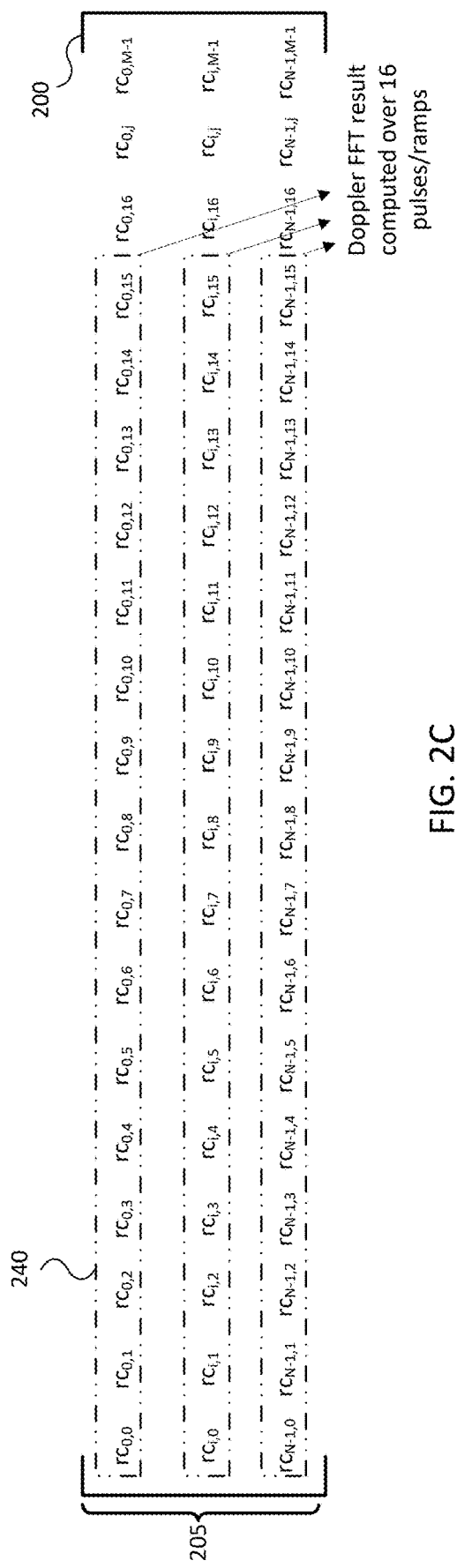

FIG. 2C illustrates the Doppler FFT performed over 16 pulses (e.g., processing size is 16) for each of the range bins 205. For example, for a 0$^{th}$ range bin, a Doppler FFT is performed over data set 240.

Figure 2D:
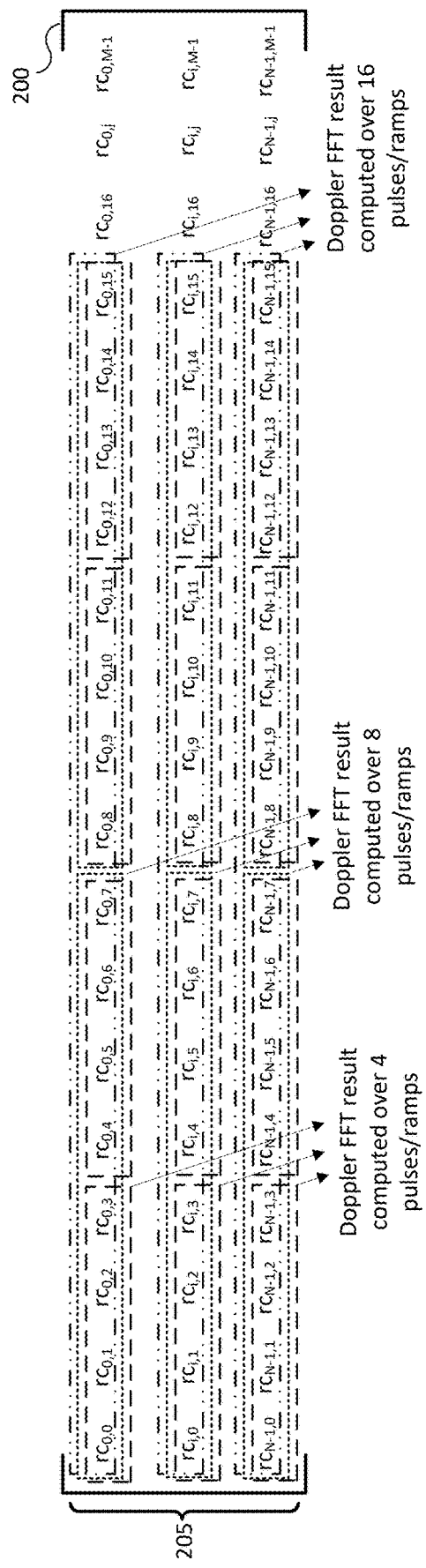
FIG. 2D illustrates an example of a hybrid multi-timescale Doppler processing based on the Doppler processing shown in FIGS. 2A, 2B, and 2C, in accordance with in accordance with one or more embodiments of the present disclosure.

FIG. 2D illustrates hybrid multi-timescale Doppler processing of the radar data matrix 200. In some embodiments, the Doppler FFT may be concurrently (e.g., simultaneously initiated) performed over 4 pulses, 8 pulses, and 16 pulses. In other words, FIG. 2D shows concurrent performance of the Doppler FFT processing shown in FIGS. 2A-2C. The concurrent Doppler processing may be performed over an arbitrary number of different processing sizes. As further discussed below by reference to FIG. 4, the FFT output(s) for each processing size may be processed to generate detection data associated with the radar return data. It is noted that not all data sets over which a Doppler FFT is performed are explicitly depicted in dotted boxes in FIGS. 2A-2D. In cases that M is not a multiple of one or more of the processing sizes, zero padding may be performed as appropriate to facilitate FFT processing.

Figure 3:
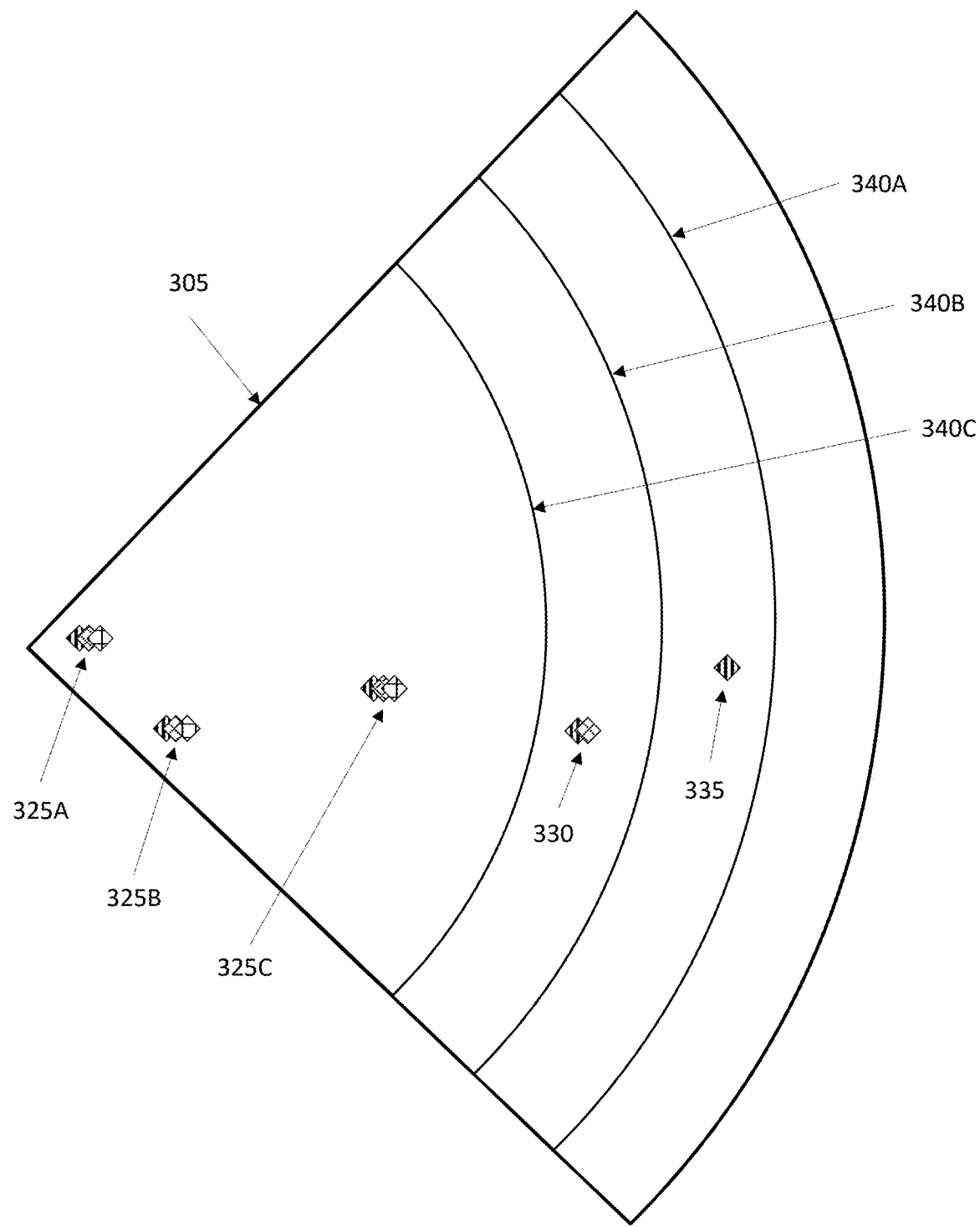
FIG. 3 illustrates an example detection zone in accordance with one or more embodiments of the present disclosure.

FIG. 3 illustrates a detection zone 305 for a radar system in which three processing sizes corresponding to three Doppler depths (e.g., potential detection ranges), are used (e.g., concurrently used) for Doppler processing in accordance with one or more embodiments of the present disclosure. The radar system may be, may include, or may be part of radar system 100 of FIG. 1. As shown in FIG. 3, the detection zone 305 includes Doppler depths 340C, 340B, and 340A, which may be indicative of a maximum potential detection range associated with a first processing size, a second processing size, and a third processing size, respectively. As an example, with reference back to FIGS. 2A-2D, the first processing size, second processing size, and third processing size may be 4, 8, and 16, respectively. Within the Doppler depth 340A, detection data may be generated by utilizing all three processing sizes. In this regard, detections associated with targets within the Doppler depth 340A may be generated at all three processing sizes. For example, points 325A-C may be detected utilizing the first, second, and third processing sizes corresponding to Doppler depth 340C, 340B, and 340A. A point 330 (e.g., between the Doppler depths 340C and 340B) may be detected utilizing the second and third processing sizes corresponding to the Doppler depths 340B and 340A, respectively. A point 335 (e.g., between the Doppler depths 340B and 340A) may be detected utilizing the third processing size corresponding to the Doppler depth 340A.

The points 325A-C, 330, and 335 may each correspond to a respective target. As an example, for each of the points 325A-C (which are within the Doppler depth 340C) detections associated with the points 325A-C resulting from processing using the first, second, and third processing sizes are superimposed. It is noted that a difference in a position of the detections (e.g., represented as three adjacent diamonds) for each of the points 325A-C is shown for clarity to illustrate overlapping detections and is not necessarily to scale (e.g., the three adjacent diamonds may overlap each other completely in some cases) As another example, the point 330 (which is between the Doppler depth 340C and 340B) shows superimposing of detections associated with processing using the second and third processing sizes. The point 335 (which is between the Doppler depth 340B and 340A) shows a detection associated with processing using the third processing size.

In an aspect, detection data is generated utilizing all three processing sizes for any target within the shortest detection range (e.g., within Doppler depth 340A). Within the shortest detection range, a rate at which the detection data is determined may be different. For example, in the case where 4, 8, and 16 data points (e.g., pulses/ramps), corresponding to the first, second, and third processing sizes, respectively, are used in multi-timescale Doppler processing, detection data (e.g., detections) generated using the second processing size may occur twice as often as when using the third processing size, and detection data (e.g., detections) generated using the first processing size may occur twice as often as when using the second processing size and four times as when using the third processing size. In this regard, the first, second, and third processing sizes correspond to a first, second, and third timescale. In some embodiments, the processing sizes may correspond to an update rate associated with the radar system where smaller processing sizes generally allow faster update rates, and larger processing sizes are generally associated with slower update rates. In this regard, smaller (e.g., shorter, lower, lesser) Doppler depths may correspond to smaller processing sizes and faster update rates while larger (e.g., longer, greater, higher) Doppler depths may correspond to larger processing sizes and slower update rates.

As such, by processing radar return data associated with the same transmitted signals using different processing sizes, the radar system may achieve performance characteristics associated with a higher number of pulses (e.g., more signal energy, longer Doppler depth, and finer speed resolution)

while also achieving performance characteristics associated with a fewer number of pulses (e.g., higher update rate). For instance, the performance characteristics associated with using a fewer number of pulses (e.g., higher update rate) may facilitate detection/tracking of targets closer to the radar system (e.g., potential targets associated with the points 325A-C), whereas the performance characteristics associated with using a higher number of pulses (e.g., longer detection range, finer speed resolution) may facilitate detection/tracking of targets farther from the radar system (e.g., potential target associated with the point 335).

In some cases, at short range (e.g., within the Doppler depth 340C), detection processing associated with the greater Doppler depths (e.g., 340A and 340B) (corresponding to the larger processing sizes) can be left out of further processing (e.g., bypassed) to efficiently save processing power of the radar system. In other cases, the detection processing associated with the greater Doppler depths (e.g., 340A and 340B) may be used to obtain finer speed resolution on slow-moving targets at short range. In this regard, for a certain range, whether data associated with the various Doppler depths are utilized may be dependent on application (e.g., desired precision, processing power, etc.).

In an embodiment, merging may be performed on the sets of detection data. The merging may involve merging and/or combining multiple sets of detection data for a single target at multiple Doppler depths into a single set of detection data (e.g., a single merged set of detection data) for the target. By correctly associating and merging multiple detections of the same target, creation of multiple incorrect targets at different Doppler depths may be avoided or reduced. In this regard, in an embodiment, merging of detection data can be performed to avoid redundant and/or overlapping tracks (e.g., two or more tracks) of the same target. In an aspect, merging may include determining detection data having common/shared range cell values and grouping the detection data together. Such common/shared range cell values may be referred to as an overlap. For example, as the data set 215 of processing size 4 has common range cell values (e.g., overlapping range cell values) with the data set 230 of processing size 8 and the data 240 of processing size 16, detection data generated based on FFT outputs of the data sets 215, 230, and 240, among other data sets, may be merged to avoid creating redundant tracks for the same target. In some cases, for a given target, grouping can be performed by keeping detection data associated with the largest SNR while discarding other detection data. In other words, grouping may involve superseding detection data with a portion of the detection data that has the largest SNR. Thus, using various embodiments, a merged set or merged sets of detection data may supersede the sets of detection data generated (e.g., independently generated) based on FFT outputs associated with different processing sizes. Target data may be generated based on the merged set(s) of detection data. In some cases, the target data is generated based on the merged set(s) of detection data and not the sets of detection data (e.g., since the sets of detection data may have overlap that may cause redundant and/or otherwise incorrect target creations/associations). These merging processes and others may include, for example, those discussed below by reference to FIG. 4.

Figure 4:
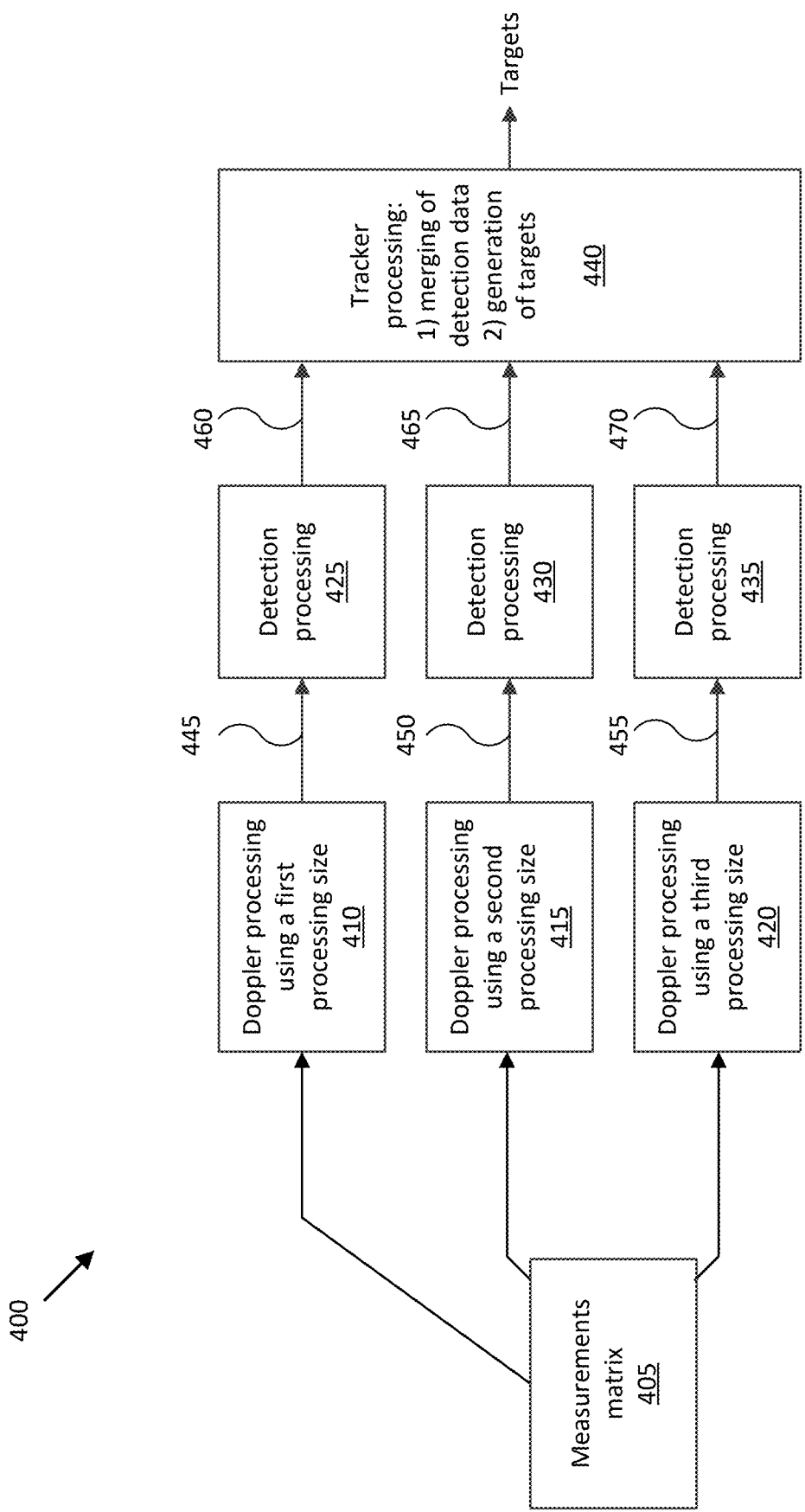
FIG. 4 illustrates a flow diagram of an example process for facilitating multi-timescale doppler processing and associated radar processing/systems in accordance with one or more embodiments of the present disclosure.

FIG. 4 illustrates an example process 400 for associating multiple target detections at multiple Doppler depths with corresponding targets in accordance with an embodiment of the present disclosure. Although the process 400 is described with reference to an example case where three processing sizes (e.g., first, second, and third processing sizes) corresponding to three Doppler depths are used for multi-timescale Doppler processing, the process 400 may be applied using any number of processing sizes. In some embodiments, a radar system performs the process 400 for associating multiple target detections at multiple Doppler depths with corresponding real targets. In some embodiments, the radar system may be, may include, or may be part of radar system 100 of FIG. 1. The process 400 may be performed using the processors 130. Some blocks of example process 400 are described herein as occurring in serial, or linearly (e.g., one after another). However, some blocks of the example process 400 may occur concurrently as described below. In addition, the blocks of the example process 400 need not be performed in the order shown and/or one or more of the blocks of the example process 400 need not be performed.

At block 405, a radar measurements matrix is provided. The radar measurements matrix may contain radar return data. For example, the radar measurements matrix may be the radar data matrix 200 described by reference to FIGS. 2A-2D. At block 410, Doppler FFT processing may be performed using the first processing size (e.g., 4 pulses) for each range index of the range dimension of the radar measurements matrix to provide FFT output 445. At block 415, Doppler FFT processing may be performed using the second processing size (e.g., 8 pulses) for each range index of the range dimension of the radar measurements matrix to provide FFT output 450. At block 420, Doppler FFT processing may be performed using the third processing size (e.g., 16 pulses) for each range index of the range dimension of the radar measurements matrix to provide FFT output 455.

In an embodiment, the processing at each of blocks 410, 415, and 420 is performed concurrently. The Doppler processing at blocks 410, 415, and 420 may result in portions of the FFT outputs 445, 450, and 455 becoming available before other portions of the FFT outputs 445, 450, and 455 become available. As such, the FFT outputs 445, 450, and 455, and portions thereof, may be sent to block 425, 430, and 435 immediately as they become available. For example, an FFT output of the data set 210 can be provided to the block 425 when the FFT output is generated and an FFT output of the data set 215 can be provided to the block 425 afterwards once it has been generated.

At block 425, 430, and 435, detection processing is performed. The FFT outputs 445, 450, and 455 may be processed at blocks 425, 430, and 435, respectively, to generate a set of detection data 460, a set of detection data 465, and a set of detection data 470, respectively, for the radar return data. In some cases, portions of the FFT outputs 445, 450, and 455 may be processed at blocks 425, 430, and 435, respectively, to generate portions of the set of detection data 460, portions of the set of detection data 465, and portions of the set of detection data 470, respectively. By way of non-limiting examples, the sets of detection data 460, 465, and 470 may include centroid position in range (e.g., Doppler and/or azimuth); intensity of radar return, SNR of detection (e.g., level above surrounding noise/clutter); size of a detection in range (e.g., depth), Doppler (e.g., Doppler spread), azimuth (e.g., target width); and/or timestamp (e.g., time at which a piece of detection data is obtained). In some embodiments, by way of non-limiting examples, detection processing (e.g., processing of the FFT outputs) to generate the sets of detection data 460, 465, and/or 470 may include performing, based at least in part on the FFT outputs, CFAR schemes, Clutter-Map schemes, thresholding schemes, and/or centroid processing. In some cases, the set of detection data 460, 465, and 470 may be provided as object reports to a tracker system to allow the tracker system to generate targets.

CMAP schemes may be performed to facilitate filtering out (e.g., remove) clutter returns. Clutter returns may be reflections from objects in a scene that are not viewed as targets by the radar system. Examples of such clutter returns may include reflections from precipitation or terrain. For example, the CMAP may be utilized to remove static clutter (e.g., buildings, trees) and dynamic clutter (e.g., wind-turbine, which may be fixed but have Doppler speed). In some embodiments, the CMAP (e.g., also referred to as a background map) may be generated by determining an averaged version of data provided to blocks 425, 430, and/or 435. For example, the CMAP may involve a time-averaged level of returns at each range, beam, and speed, or groups of ranges, beams, and speeds. The CMAP may automatically take out and adapt to a radar internal noise level, coupling, and/or any other artifacts that may be present. In some cases, the CMAP may automatically take out and adapt such artifacts when they stay in the same range cells. Since the CMAP adapts to changes, the CMAP may facilitate radar detection during changing environmental conditions, such as snowfalls, vegetation growing, etc.

CFAR schemes may be performed to facilitate adaptively determining a threshold (e.g., power threshold, detection threshold) above which any radar return signal can be considered to be likely (e.g., with sufficient probability) to originate from a target. In one embodiment, a CFAR scheme may be utilized to track changes in conditions and adjust the detection threshold to maintain a constant probability of false alarm. The CFAR may react (e.g., instantaneously or substantially instantaneously react) to changes that affect a large area (e.g., rain). In a cell-averaging CFAR, the space may be separated in large cells, such that a largest possible target is less than half the size of a cell. A median level of the returns in each cell may be determined and that level added to a threshold. In this manner, when targets are present, the threshold is not changed, but when a large perturbation occurs, the threshold increases to avoid false-alarms.

Thresholding schemes may be performed to facilitate determining if an instantaneous radar return in one range cell exceeds a threshold and should be considered a detection of a target. Centroid processing may be performed to determine a precise location of grouped-detections based on center-of-intensity.

At block 440, the tracker merges the sets of detection data 460, 465, and 470. Merging may be performed since the FFT outputs 445, 450, and 455 may be utilized to generate detection data based on the same range cell(s) (e.g., range, azimuth and Doppler). To avoid creating several tracks for the same target, the sets of detection data 460, 465, and 470 corresponding to the FFT outputs 445, 450, and 455 may be merged. In this regard, the sets of detection data 460, 465, and 470 may contain redundant detection data because each of the FFT outputs 445, 450, and 455 may be generated using the same underlying information from the radar measurements matrix provided at block 405. As an example, the data set 220 of processing size 4 has common range cell values (e.g., overlapping range cell values) with the data set 235 of processing size 8 and the data 240 of processing size 16. In this example, detection data generated based on range cells values $rc_{0,8}$, $rc_{0,9}$, $rc_{0,10}$, $rc_{0,11}$, among other overlapping range cell values, may create redundant tracks for the same target.

Merging the sets of detection data 460, 465, and 470 to avoid creating multiple targets at each Doppler depth may be performed in various ways. For example, the merging may be performed by determining which portions of the sets of detection data 460, 465, and 470 share common range cells and grouping such portions of the detection data together. In some cases, the grouping may be done by maintaining only the detection data that has the largest SNR while disregarding or eliminating the remaining detection data.

In some embodiments, the tracker generates target data. Target data may include information associated with one or more targets or potential targets detected by the radar system. Such information may include, for example, a location of a target, a velocity (e.g., speed and direction) of a target, a heading associated with a target, and/or others. Generating target data may be performed by target tracking algorithms. For example, generating target data may include associating new contacts with existing tracks. Generating target data may further include updating/filtering new track positions using information such as centroid positions from newly associated contact(s). Generating target data may further include extrapolating/coasting positions of tracks that do not receive new detection information in the current scan/iteration (e.g., no association new detection information and current tracks). Generating target data may further include initiating new tracks with un-associated contacts. Generating target data may further include terminating tracks with no recent associations. In some embodiments, the tracker generates scene information of the scene. The scene information may include target data (e.g., information associated with objects of interest) and other information (e.g., information associated with objects not of interest and/or generally other information associated with the scene).

In some embodiments, the FFT outputs 445, 450, and 455, or portions thereof, are sent to blocks 425, 430, and 435, respectively, immediately upon availability for processing. Similarly, in some embodiments, pieces/portions of the sets of detection data 460, 465, and 470 may be generated in response to portions of the FFT outputs 445, 450, and 455 as they are received at blocks 425, 430, and 435 and sent to a tracker at block 440 for processing immediately upon availability. The tracker may process portions of the sets of detection data 460, 465, and 470 immediately upon availability to update radar tracks. When the tracker receives new detection data as a result of processing additional FFT outputs, or portions thereof, the tracker may update the radar tracks based on the new detection data. The radar tracks that are not detected in the FFT outputs of the current update of new detection data may be coasted/extrapolated until the next update of new detection data.

The detection processing at blocks 425, 430, and 435 may result in some portions of each of the sets of detection data 460, 465, and 470 becoming available before other portions of the same become available. As such, portions of each of the sets of detection data 460, 465, and 470, or portions thereof, may be fed to the tracker at block 440 as they become available.

In some embodiments, the target data that is generated at block 440 may be utilized to determine whether and/or what type of actions to perform. If the target data indicates that no targets are present, the radar system continues to monitor for targets without performing any mitigation actions. If the target data indicates that a target(s) is present, the radar system (e.g., human operator, autonomous system) may determine whether and/or what type of mitigation actions to perform. For example, if the radar system is utilized as part of a search-and-rescue application, a target may be a person needing to be rescued and a mitigation action in response to identifying the target (e.g., determining position and/or velocity of the target) may be to transmit signals to appropriate first responders to provide aid to the target. As another example, if the radar system is utilized as part of a navigation application of a manned or unmanned vehicle, a target may be an obstacle (e.g., moving or otherwise) to be avoided during navigation and a mitigation action in response to identifying the target (e.g., determining position and/or velocity of the target) may be to maneuver (e.g., autonomously or with human action) the vehicle to avoid the target.

Figure 5:
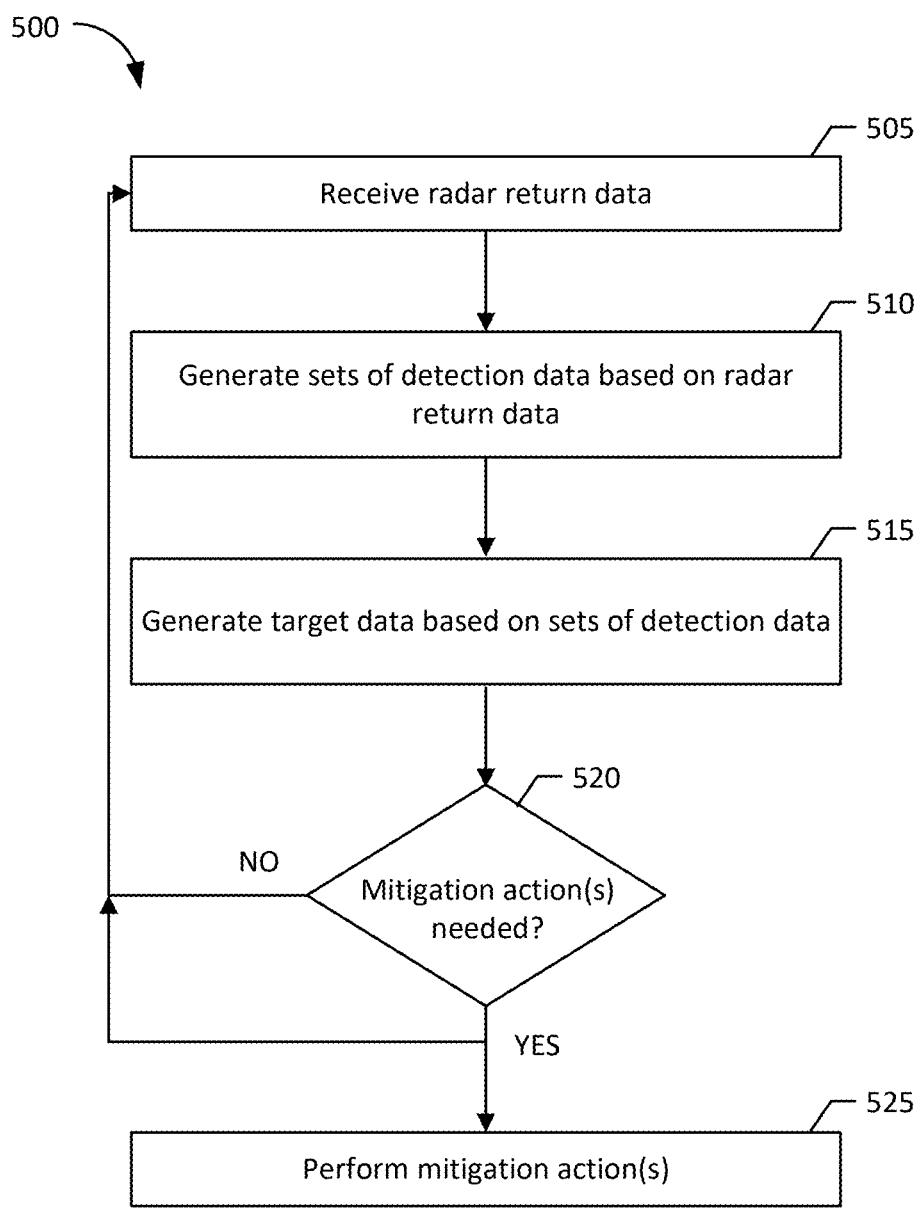
FIG. 5 illustrates a flow diagram of an example process for facilitating multi-timescale doppler processing and associated radar processing/systems in accordance with one or more embodiments of the present disclosure.

FIG. 5 illustrates an example process 500 for facilitating multi-timescale doppler processing and associated radar processing/systems in accordance with one or more embodiments of the present disclosure. In some embodiments, the radar system 100 of FIG. 1 performs the process 500. For instance, the process 500 may be performed using the processors 130. Some blocks of example process 500 are described herein as occurring in serial, or linearly (e.g., one after another). However, some blocks of the example process 500 may occur concurrently as described below. In addition, the blocks of the example process 500 need not be performed in the order shown and/or one or more of the blocks of the example process 500 need not be performed.

At block 505, the receiver 120 (e.g., an RX antenna) receives radar return data. The radar return data may be associated with reflections, from a scene, of a plurality of transmitted radar signals (e.g., transmitted pulses). At block 510, the processors 130 generate sets of detection data (e.g., 460, 465, 470) based on the radar return data. Each of the sets of detection data may be associated with a respective processing size. In an aspect, the processing size is an FFT size. In some cases, the processors 130 may sample the radar return data received by the receiver 120 and generate a measurements matrix based on the sampled radar return data. Each element of the measurements matrix may be referred to as a range cell value, with each range cell value being a sampled signal for a certain range index and a certain transmitted radar signal. In an aspect, FFTs of various sizes can be performed (e.g., concurrently performed) on the measurements matrix to generate FFT outputs (e.g., 445, 450, 455). The FFT outputs may then be processed to obtain the sets of detection data. At block 515, the processors 130 generate target data based on the sets of detection data. The target data may include position data and velocity data (e.g., speed and direction) associated with various targets. In an aspect, the processors 130 may merge the sets of detection data and generate the target data based on merged detection data. In an aspect, such merging may be performed to mitigate effects associated with the different sets of detection data being generated using the same underlying radar return data, as previously discussed above. For instance, merging of the sets of detection data may be performed to avoid generating multiple tracks for the same target.

At block 520, the processors determine whether mitigation action(s) are needed based on the target data. For instance, the target data may include position data and velocity data associated with various targets. As one example, no mitigation action may be needed if identified targets are moving slowly toward a certain location (e.g., a location of the radar system) or moving rapidly in a direction away from the certain location. As another example, if an identified target is moving rapidly toward the certain location, such as a location of the radar system, a mitigation action may be to move the radar system to avoid a collision with the identified target. If no mitigation action is determined to be needed, the process 500 proceeds back to block 505, in which subsequent radar return data is received. In this regard, for example, if the target data indicates that no targets are present, the radar system 100 may continue to monitor for targets without performing any mitigation actions.

If a mitigation action(s) is determined to be needed, the process proceeds to block 525 in addition to proceeding back to block 505. At block 525, the radar system 100 performs a mitigation action(s) based on the target data. In some cases, the processors 130 may generate a control signal(s) to cause performance of a mitigation action(s) by other components of the radar system 100 or other system(s) communicatively coupled to the radar system 100. For example, a system communicatively coupled to the radar system 100 may be a vehicle (e.g., aerial, naval, or terrestrial) whose navigation is facilitated by the radar system 100.

In general, whether mitigation action(s) are needed may be dependent on application. With regard to blocks 520 and 525, if the target data indicates that a target(s) is present, the radar system (e.g., human operator, autonomous system) may determine whether and/or what type of mitigation actions to perform. For example, if the radar system 100 is utilized as part of a search-and-rescue application, a target may be a person needing to be rescued and a mitigation action in response to identifying the target (e.g., determining position and/or velocity of the target) may be to transmit signals to appropriate first responders to provide aid to the target. As another example, if the radar system 100 is utilized as part of a navigation application of a manned or unmanned vehicle, a target may be an obstacle (e.g., moving or otherwise) to be avoided during navigation and a mitigation action in response to identifying the target (e.g., determining position and/or velocity of the target) may be to maneuver (e.g., autonomously or with human action) the vehicle to avoid the target.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A method comprising:
receiving, by a receiver, radar return data, wherein the radar return data is associated with reflections, from a scene, of a plurality of transmitted radar signals, the radar return data comprising, for each transmitted radar signal, a range bin measurement for each of a plurality of range bins;
performing a plurality of Doppler processing operations each of which provides Doppler information comprising frequency and/or velocity information for targets and/or potential targets;
wherein each Doppler processing operation is performed on a corresponding set of range bin measurements obtained from a corresponding set of a corresponding number of the transmitted radar signals, wherein for at least two of the Doppler processing operations the corresponding numbers of the transmitted radar signals are different from each other;
wherein at least one range bin measurement is used in at least two of the Doppler processing operations whose corresponding numbers of the transmitted radar signals are different from each other;
for each number of the corresponding numbers of the transmitted radar signals, processing the Doppler information provided by all of the one or more Doppler processing operations corresponding to the number to obtain a corresponding set of detection data; and
generating target data associated with the scene based at least in part on the sets of detection data.

2. The method of claim 1, wherein each Doppler processing operation is performed on the range bin measurements of a corresponding single one of the range bins.

3. The method of claim 1, wherein each Doppler processing operation comprises a Fast Fourier Transform (FFT).

4. The method of claim 1, wherein the corresponding numbers comprise at least three different numbers.

5. The method of claim 1, wherein for at least one range bin, each radar bin measurement is used in at least two of the Doppler processing operations whose corresponding numbers of the transmitted radar signals are different from each other.

6. The method of claim 1, further comprising performing a mitigation action based on the target data.

7. The method of claim 1, wherein for at least one range bin, each radar bin measurement is used with each of the numbers of the transmitted radar signals.

8. The method of claim 1, wherein:
the range bins comprise a first range bin and a second range bin corresponding to a shorter range than the first range bin;
the numbers of the transmitted radar signals comprise a first number and a second number lower than the first number;
the first range bin is used with the first and second numbers; and
the second range bin is used with the second number but not the first number.

9. The method of claim 1, wherein the radar return data comprises a radar measurements matrix, wherein each row of the radar measurements matrix is associated with one of a plurality of range bins, wherein each column of the radar measurements matrix is associated with one of the plurality of transmitted radar signals, and wherein Doppler processing operation is associated with processing of a respective number of columns of the radar measurement matrix within the same range bin.

10. The method of claim 1, wherein each of the plurality of transmitted radar signals is a pulse or a ramp.

11. The method of claim 1, further comprising merging the sets of detection data to obtain a merged set of detection data, wherein the generating is based at least in part on the merged set of detection data.

12. The method of claim 11, wherein the merging the sets of detection data comprises:
determining that range bins of the radar return data are shared by at least a subset of the sets of detection data;
grouping, based at least in part on the determining, the subset of the sets of detection data to obtain a grouped subset of detection data; and
superseding the subset of the sets of detection data with the grouped subset of detection data,
wherein the generating is based at least in part on the grouped subset of detection data.

13. The method of claim 12, wherein the grouping is based at least in part on a signal-to-noise ratio associated with each of the sets of detection data.

14. A system, comprising:
a receiver configured to receive radar return data, wherein the radar return data is associated with reflections, from a scene, of a plurality of transmitted radar signals, the radar return data comprising, for each transmitted radar signal, a range bin measurement for each of a plurality of range bins;
a processor coupled to the receiver; and
a non-transitory machine-readable medium comprising instructions stored therein, which when executed by the processor, cause the processor to perform operations comprising:
performing a plurality of Doppler processing operations each of which provides Doppler information comprising frequency and/or velocity information for targets and/or potential targets;
wherein each Doppler processing operation is performed on a corresponding set of range bin measurements obtained from a corresponding set of a corresponding number of the transmitted radar signals, wherein for at least two of the Doppler processing operations the corresponding numbers of the transmitted radar signals are different from each other;
wherein at least one range bin measurement is used in at least two of the Doppler processing operations whose corresponding numbers of the transmitted radar signals are different from each other;
for each number of the corresponding numbers of the transmitted radar signals, processing the Doppler information provided by all of the one or more Doppler processing operations corresponding to the number to obtain a corresponding set of detection data; and
generating target data associated with the scene based at least in part on the sets of detection data.

15. The system of claim 14, wherein each Doppler processing operation is performed on the range bin measurements of a corresponding single one of the range bins.

16. The system of claim 14, wherein the corresponding numbers comprise at least three different numbers.

17. The system of claim 14, wherein for at least one range bin, each radar bin measurement is used in at least two of the Doppler processing operations whose corresponding numbers of the transmitted radar signals are different from each other.

18. The system of claim 14, wherein the operations further comprise performing a mitigation action based on the target data.

19. The system of claim 14, wherein:
the range bins comprise a first range bin and a second range bin corresponding to a shorter range than the first range bin;
the numbers of the transmitted radar signals comprise a first number and a second number lower than the first number;
the first range bin is used with the first and second numbers; and
the second range bin is used with the second number but not the first number.

20. The system of claim 14, wherein each Doppler processing operation comprises a Fast Fourier Transform (FFT).

* * * * *